United States Patent
Savatsky et al.

(10) Patent No.: US 11,186,654 B2
(45) Date of Patent: Nov. 30, 2021

(54) METHODS FOR CONTROLLING START UP CONDITIONS IN POLYMERIZATION PROCESSES

(71) Applicant: ExxonMobil Chemical Patents Inc., Baytown, TX (US)

(72) Inventors: Bruce J. Savatsky, Kingwood, TX (US); Richard E. Pequeno, Baytown, TX (US); Michael E. Muhle, Kingwood, TX (US); Robert O. Hagerty, Wyckoff, NJ (US); Richard B. Pannell, Liberty, TX (US); Eric J. Markel, Kingwood, TX (US); Mark W. Blood, Hurrican, WV (US); Mark B. Davis, Lake Jackson, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 222 days.

(21) Appl. No.: 16/471,240

(22) PCT Filed: Nov. 9, 2017

(86) PCT No.: PCT/US2017/060853
§ 371 (c)(1),
(2) Date: Jun. 19, 2019

(87) PCT Pub. No.: WO2018/118258
PCT Pub. Date: Jun. 28, 2018

(65) Prior Publication Data
US 2021/0130507 A1 May 6, 2021

Related U.S. Application Data

(60) Provisional application No. 62/436,814, filed on Dec. 20, 2016.

(51) Int. Cl.
| C08F 2/34 | (2006.01) |
| C08F 210/02 | (2006.01) |
| C08F 210/08 | (2006.01) |
| C08F 210/14 | (2006.01) |

(52) U.S. Cl.
CPC .............. *C08F 2/34* (2013.01); *C08F 210/02* (2013.01); *C08F 210/08* (2013.01); *C08F 210/14* (2013.01)

(58) Field of Classification Search
None
See application file for complete search history.

(56) References Cited

U.S. PATENT DOCUMENTS

| 4,469,853 A | 9/1984 | Mori et al. |
| 4,558,105 A | 12/1985 | Carrick et al. |
| 7,838,605 B2 | 11/2010 | Sandell et al. |
| 2003/0008982 A1 | 1/2003 | Mahling et al. |
| 2007/0032614 A1 | 2/2007 | Goossens et al. |
| 2007/0073012 A1* | 3/2007 | Pannell ...................... C08F 2/34 526/74 |
| 2010/0144989 A1* | 6/2010 | Kolb ....................... C08F 10/02 526/126 |
| 2011/0152484 A1 | 6/2011 | Chamayou et al. |

* cited by examiner

*Primary Examiner* — Richard A Huhn
(74) *Attorney, Agent, or Firm* — ExxonMobil Chemical Patents Inc.-Law Department (57) ABSTRACT

A method for controlling the start up conditions in a gas phase polymerization process is provided. An inventory can be calculated for each monomer, comonomer, and hydrogen sufficient to produce a polyethylene polymer having desired properties, such as, a certain melt index and/or density.

17 Claims, 8 Drawing Sheets

METHODS FOR CONTROLLING START UP CONDITIONS IN POLYMERIZATION PROCESSES

CROSS-REFERENCE OF RELATED APPLICATIONS

This application is a National Phase Application claiming priority to PCT Application Serial No. PCT/US2017/060853 filed Nov. 9, 2017, which claims priority to U.S. Provisional Application No. 62/436,814 filed Dec. 20, 2016, the disclosures of which are hereby incorporated by reference in their entirety.

FIELD OF THE INVENTION

The invention generally relates to methods for controlling the start up conditions in polymerization processes for the production of polyolefin polymers. More particularly, embodiments described herein relate to methods for controlling the start up conditions in polymerization processes within a reactor system to prevent fouling, sheeting, and/or cycle line plugging.

BACKGROUND OF THE INVENTION

Polymerization processes for the production of polyolefin polymers employing metallocene catalysts have increased sensitivity to sheeting, plate fouling, and chunking during start up that has not been observed in polymerization processes employing conventional Zeigler-Nana catalysts. This increased sensitivity is believed to be due, in part, to difficulties in maintaining reactor raw material concentrations during start up operations and the additional sensitivities of metallocene catalysts to certain catalyst poisons.

Problems with maintaining proper reactor raw material concentrations during start up stem largely from the intrinsically faster response time of reactant concentrations during metallocene catalyst operations. Process gas analyzers are typically used to monitor and control concentrations within the reactor. Such gas analyzers, however, are prone to start up related malfunctions such as calibration errors and the plugging of analyzer sample lines with polymer granules and gas phase compositions can swing appreciably due to swings in temperature and pressure. Cycle gas sampling systems can also plug during start up, particularly when high levels of catalyst fines are circulating in the cycle gas loop during start up. The presence of catalyst fines in the sampling system also can lead to erroneous results due to depletion of monomer and/or comonomer.

Thus, there is a still a need for improved methods for gas phase polymerization processes to provide increased productivity and reduced tendency for fouling, sheeting, and/or cycle line plugging.

SUMMARY OF THE INVENTION

In a class of embodiments, the invention provides for a method for controlling start up conditions in a gas phase polymerization process, the method comprising: calculating an inventory for each monomer, comonomer, and hydrogen sufficient to produce a polyethylene polymer having a desired melt index and/or density; introducing a flow of the monomer, comonomer, and hydrogen to a reactor that is pre-loaded with polymer granules; stopping the flow of the comonomer to the reactor once the pre-determined comonomer inventory has been added to the reactor; introducing a catalyst system to the reactor at a pre-determined catalyst feed rate; polymerizing the monomer and comonomer in the presence of the catalyst system at polymerization conditions sufficient to produce the polyethylene polymer; and then adding additional monomer, comonomer, and hydrogen to the reactor at a predetermined rate based on the polymer production rate and polymer melt index and/or density.

In another class of embodiments, the invention provides for a method for controlling start up conditions in a gas phase polymerization process, the method comprising: calculating an inventory for each monomer, comonomer, and hydrogen sufficient to produce a polyethylene polymer having a desired melt index and/or density; introducing a flow of the monomer, comonomer, and hydrogen to a reactor pre-loaded with polymer granules, the polymer granules having a melt index and density that are the same or substantially the same as the desired melt index and/or density of the polyethylene polymer; monitoring the concentration of the monomer, comonomer, and hydrogen as a function of time to predict a concentration for each monomer, commoner, and hydrogen; stopping the flow of the comonomer to the reactor once the pre-determined comonomer inventory has been added to the reactor; introducing a catalyst system to the reactor at a pre-determined catalyst feed rate into the reactor; polymerizing the monomer and comonomer in the presence of the catalyst system at polymerization conditions sufficient to produce the polyethylene polymer at a production rate of about 10% to 15% of the steady-state production rate; and then adding additional monomer, comonomer, and hydrogen to the reactor at a predetermined rate based on the polymer production rate and polymer melt index and/or density.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

Figure 1:
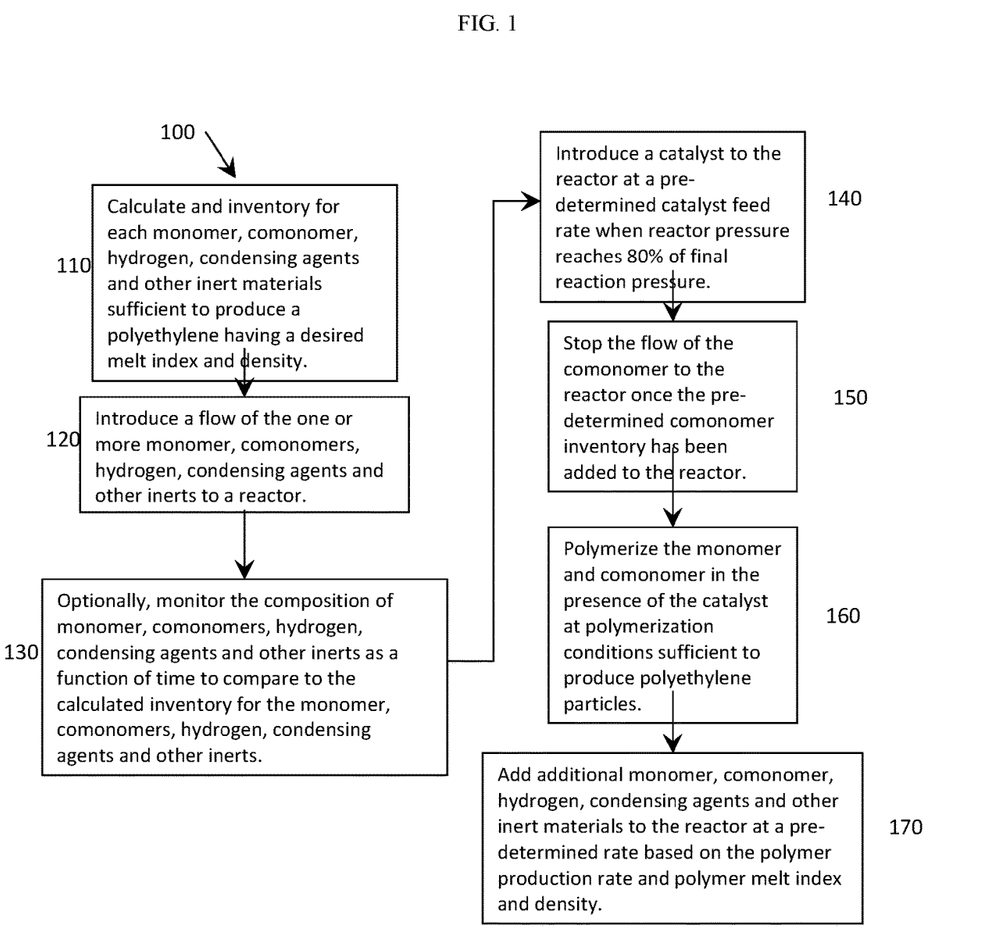
FIG. 1 is a flow diagram depicting an illustrative method for a start up according to one or more embodiments described herein.

Methods for controlling the start up conditions (or simply, "start up") in a gas phase polymerization process are provided. FIG. 1 is a flow diagram depicting one illustrative method 100 according to one or more embodiments described herein. In step 110, an inventory can be calculated for each monomer, comonomer, hydrogen, condensing agents and other inert materials that is sufficient to produce a polyolefin polymer having a desired properties, for example, melt index and/or density. Based on the calculated inventory, a flow of the one or more monomers, comonomers, and hydrogen can be introduced to a reactor in step 120. This step or phase of the start up can be referred to as the "concentration build." If desired, the reactor can be pre-loaded with one or more polymer granules. These pre-loaded polymer granules can have, but is not required to have, the desired melt index and density, or substantially the same melt index and density as the desired polyolefin product. Loading the reactor with polymer granules of the melt index and density of the desired product may reduce or eliminate off specification polymer production during reactor start up.

When the reactor pressure reaches about 80% of the final reaction pressure, a catalyst can then be fed or otherwise introduced into the reactor at a pre-determined rate to polymerize the monomer and comonomer in step 140. The monomer and comonomer can be polymerized in the presence of the catalyst at one or more polymerization conditions sufficient to produce the desired polymer. This step or phase can be referred to as "lightoff". The catalyst feed can commence slightly before full design pressure is reached in order to build catalyst inventory and decrease the period of waiting before lightoff.

Upon obtaining the pre-determined comonomer inventory in the reactor based on flow meter data, the concentration build step is complete and flow of the comonomer can be stopped in step 150. The end of the concentration build phase also can be detected when the reactor reaches full pressure since the inventories are based on partial pressures of each gas constituent within the reactor at a design start up pressure.

A catalyst can then be fed or otherwise introduced into the reactor at a pre-determined rate to polymerize the monomer and optional comonomer in step 140. The monomer and comonomer can be polymerized in the presence of the catalyst at one or more polymerization conditions sufficient to produce the desired polyethylene particles. The catalyst feed can commence slightly before full design pressure is reached in order to build catalyst inventory and decrease the period of waiting before lightoff. In step 160, at least one of the one or more polymerization conditions can be monitored or otherwise controlled in order to obtain a production rate of about 5% to about 25% of the steady-state production rate. In some embodiments, a production rate of about 10% to about 15% of the steady-state production rate also can be used. Additional monomer, comonomer, and hydrogen can then be added to the reactor at a predetermined rate based on the polymer production rate and polymer melt index and density in step 170. Duration of this portion of start up (step 170) can vary and can depend on factors such as residual poisons in the bed, catalyst feed rate, and hydrogen feed rate, for example.

Flow meters can be used to introduce and control the flow of the monomer, comonomer, hydrogen, condensing agents and other inert materials into the reactor based on the calculated inventories. Historical data from prior start up procedures are helpful in calculating the inventory of the monomer, comonomer, and hydrogen into the reactor. Alternatively, the inventory of the monomer, comonomer, and hydrogen can be calculated based on solubilities of reaction and inert components in the seed bed resin.

In one or more embodiments, the reactor system can include a reactor body in fluid communication with one or more discharge tanks, surge tanks, heat exchangers, and recycle compressors. The reactor body includes a reaction zone within the reactor body in fluid communication with a velocity reduction zone, typically, at the top of the reactor body and having a conical geometry with increasing diameter. The reaction zone can include a bed of growing polymer particles, formed polymer particles, and catalyst particles fluidized by the continuous flow of polymerizable and modifying gaseous components in the form of make-up feed and recycle fluid through the reaction zone.

A feed stream can enter the cycle line before or after the compressor, but can also be at any point in the polymerization system including to the reactor fluid bed, the expanded section or to the cycle line before or after the cooler as depicted with alternative feed stream location. The term "feed stream" as used herein refers to a stream comprising one or more raw materials, either in a gas phase or liquid phase, used in a polymerization process to produce a polymer product. For example, a feed stream can be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives or mixtures thereof. The feed stream can also include a non-olefinic gas, such as nitrogen and/or hydrogen. The feeds can enter the reactor at multiple and different locations. For example, monomers can be introduced into the polymerization zone in various ways including direct injection through a nozzle into the bed. The feed stream can further include one or more non-reactive alkanes that can be condensable in the polymerization process for removing the heat of reaction, commonly referred to as Induced or Inert Condensing Agents (ICAs). Illustrative non-reactive alkanes include, but are not limited to, propane, n-butane, isobutane, n-pentane, isopentane, neopentane, hexane or isomers thereof and derivatives or mixtures thereof. Such operation is referred to in the art as "condensed mode" or "super condensed mode" operation.

The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.52 m/sec and usually no more than 0.762 m/sec is sufficient.

In general, the height to diameter ratio of the reaction zone can vary in the range of from 2:1 to 5:1. The range, of course, can vary to larger or smaller ratios and depends upon the desired production capacity. The cross-sectional area of the velocity reduction zone is typically within the range of 2 to 3 multiplied by the cross-sectional area of the reaction zone.

The velocity reduction zone has a larger inner diameter than the reaction zone. As the name suggests, the velocity reduction zone slows the velocity of the gas due to the increased cross sectional area. This reduction in gas velocity drops the entrained particles into the bed, allowing primarily only gas to flow from the reactor. That gas exiting the overhead of the reactor is the recycle gas stream.

The recycle stream can be compressed using a compressor and then passed through a heat exchange zone where heat is removed before it is returned to the bed. The heat exchange zone can be any type of heat exchanger, including any horizontal or vertical type. If desired, more than one heat exchangers can be used to lower the temperature of the cycle gas stream in stages. It is also possible to locate the compressor downstream from the heat exchanger or at an intermediate point between several heat exchangers.

After cooling, the recycle stream can be returned to the reactor. Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,415 and 6,627,713. The cooled recycle stream can absorb the heat of reaction generated by the polymerization reaction.

The catalyst or catalyst system can be injected at a point into the bed where good mixing with the polymer particles can occur. For example, the catalyst can be injected into the bed at a point above the distributor plate. Injecting the catalyst at a point above the distribution plate provides satisfactory operation of the fluidized-bed reactor. Injection of the catalyst into the area below the distributor plate could cause polymerization to begin there and eventually cause plugging of the distributor plate. Injection directly into the fluidized bed aids in distributing the catalyst uniformly throughout the bed and tends to avoid the formation of localized spots of high catalyst concentration that can cause "hot spots" to form. An activator and/or modifier compound can also be added to the reaction system either directly into the fluidized bed or downstream of the heat exchanger in which case the modifier is fed into the recycle system from a dispenser.

The polymerization reaction can be conducted substantially in the absence of catalyst poisons, such as moisture, oxygen, water, carbon monoxide, and/or acetylene. However, oxygen can be added to the reactor at very low concentrations to alter the polymer structure and its product performance characteristics. For example, oxygen can be added at a concentration relative to the ethylene feed rate to the reactor of 10 to 600 ppbv, and more preferably 10 to 500 ppbv.

In order to achieve the desired density ranges in the copolymers, it may be necessary to copolymerize enough of the comonomers with ethylene to achieve a level of 0 to anywhere from 5 to 20 weight percent of the comonomer in the copolymer. The amount of comonomer needed to achieve this result will depend on the particular comonomer(s) being employed. The ratio of the comonomer to ethylene can be controlled to obtain the desired resin density of copolymer product.

A gas analyzer can be used to determine the composition of the recycle stream and the composition of the make-up feed stream and can be adjusted accordingly to maintain an essentially steady state gaseous composition within the reaction zone. The gas analyzer can be any conventional gas analyzer that can measure the recycle stream composition to maintain the ratios of feed stream components. Such equipment is commercially available from a wide variety of sources. The gas analyzer(s) can be positioned to receive gas from a sampling point located between the velocity reduction zone and heat exchanger.

The rate of polymer production in the bed depends on the rate of catalyst injection, the concentration of monomer(s) in the reaction zone, and the reaction temperature. The production rate can be controlled by adjusting the rate of catalyst injection. Since any change in the rate of catalyst injection can change the reaction rate and thus the rate at which heat is generated in the bed, the temperature of the recycle stream entering the reactor can be adjusted to accommodate change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed can be maintained at essentially a constant height by withdrawing a portion of the bed at the rate of formation of the particulate polymer product.

On discharge of particulate polymer product from gas phase fluidized bed reactor body, it is desirable and preferable to separate fluid from the product and to return the fluid to the recycle line. There are numerous ways known to the art to accomplish this separation. As one example, fluid and product can leave the reactor body and enter the product discharge tanks through a valve, which can be a ball valve designed to have minimum restriction to flow when opened. Positioned above and below the product discharge tank can be conventional valves. The valve(s) allow passage of product into the product surge tanks. Another preferred product discharge system which can be alternatively employed is that disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor can be equipped with an adequate venting system to allow venting the bed during start up and shut down. The reactor does not require the use of stirring and/or wall scraping. The recycle line and the elements therein should be smooth-surfaced and devoid of unnecessary obstructions so as not to impede the flow of recycle fluid or entrained particles.

The conditions for polymerizations vary depending upon the monomers, catalysts, and equipment availability. The specific conditions are known or readily derivable by those skilled in the art. For example, the temperatures are within the range of from −10° C. to 120° C., often 15° C. to 110° C. Pressures are within the range of from 0.1 bar to 100 bar, such as 5 bar to 50 bar, for example. Additional details of polymerization processes can be found in U.S. Pat. No. 6,627,713.

The catalyst can be introduced or delivered to the reactor using any suitable device, system, or combination of devices and/or systems. One example of a catalyst slurry delivery system can include one or more effervescent nozzles in which a stream of liquid or gas can flow through an inner tube, while the catalyst slurry can flow co-currently through an annular space defined by the inner tube and a concentric outer tube. The direction of flow of the liquid and/or gas is generally along the central axis of the tubes. For example, the catalyst slurry can flow through the annular space and a gas, such as nitrogen, can flow through the inner tube. The catalyst slurry and gas can mix within the annular space toward a distal end of the nozzle. For example, toward the distal end or tip of the inner tube, though not necessarily at the end, there can be holes or orifices that allow the gas to enter the catalyst slurry. The gas can be introduced into the co-current flowing catalyst slurry near a common exit orifice of the nozzle. In this way, catalyst slurry slugging can be prevented and steady droplet formation can be promoted. Gas bubbles that form upon mixing the gas and catalyst slurry can be forced through an orifice at the tip of the outer tube, forcing the concurrent flow of catalyst slurry along the outside edge of the orifice. A thin film of catalyst slurry on the orifice wall can be ejected from the orifice in thin sheets which disintegrate into small droplets within the fluidized bed polymerization reactor. As such, the effervescent nozzle can cause the catalyst slurry to disperse into small droplets upon exiting the effervescent nozzle. Other suitable effervescent nozzles suitable for introducing the catalyst slurry to the reactor can be similar to those discussed and described in U.S. Pat. Nos. 5,962,606 and 6,075,101; EP 0 961 784 B; and WO Publication Nos. WO 98/37101; WO 2008/042078A1; WO 2008/042177A1; and WO 2008/042182A1.

Another example of a catalyst slurry delivery system can include one or more effervescent nozzles in which a stream of liquid or gas can flow through a first or "inner" conduit, the catalyst slurry can flow through an annulus formed between the first conduit and a second or "intermediate" conduit, and a feed stream can flow through an annulus formed between the second conduit and a third or "outer" conduit. The liquid or gas flowing through the first or inner conduit can mix or otherwise combine with the catalyst slurry similar as discussed above. The feed stream and the catalyst slurry/gas or liquid mixture can contact one another within the reactor. The effervescent nozzle suitable for introducing the catalyst slurry and the feed stream to the reactor can be similar to the nozzle described in U.S. Publication No. 2010/0041841.

Another example of a catalyst delivery system is a dry catalyst feeder. The catalyst powder is metered to the reactor using an injection tube using a non-polymerizable fluid to transfer the catalyst into the reactor as described in U.S. Pat. No. 3,876,602.

Hydrogen gas can be used in olefin polymerization to control the final properties of the polyolefin, such as described in "Polypropylene Handbook," at pages 76-78 (Hamer Publishers, 1996). Using certain catalyst systems, increasing concentrations (partial pressures) of hydrogen can increase the melt index (MI) ($I_2$) of the polyolefin generated. The MI can thus be influenced by the hydrogen concentration. The amount of hydrogen in the polymerization reactor can be expressed as a mole ratio relative to the total polymerizable monomer, for example, ethylene, or a blend of ethylene and hexane, octene, or propylene. The amount of hydrogen used in the polymerization process can be an amount necessary to achieve the desired MI of the final polyolefin resin. The mole ratio of hydrogen to total monomer ($H_2$:monomer) can be in a range from greater than 0.0001 in one example, and from greater than 0.0005 in another example, and from greater than 0.001 in yet another example, and less than 10 in yet another example, and less than 5 in yet another example, and less than 3 in yet another example, and less than 0.10 in yet another example, where a desirable range can include any combination of any upper mole ratio limit with any lower mole ratio limit described herein. Expressed another way, the amount of hydrogen in the reactor at any time can range to up to 5,000 ppm, and up to 4,000 ppm in another example, and up to 3,000 ppm in yet another example, and between 50 ppm and 5,000 ppm in yet another example, and between 500 ppm and 2,000 ppm in another example. In yet another example, the ratio of hydrogen to total monomer ($H_2$:monomer) can be about 0.00001:1 to about 2:1, about 0.005:1 to about 1.5:1, or about 0.0001:1 to about 1:1.

The reactor temperature can range from about 30° C., about 40° C., or about 50° C. to about 90° C., about 100° C., about 110° C., about 120° C., or about 150° C. In general, the reactor temperature can be operated at the highest feasible temperature taking into account the sintering temperature of the polymer product within the reactor. Regardless of the process used to make the polyolefin polymers, the polymerization temperature or reaction temperature should be below the melting or "sintering" temperature of the polyolefin polymers to be formed. Thus, the upper temperature limit in one example can be the melting temperature of the polyolefin produced in the reactor.

The pressure within the reactor can vary from about 700 kPa to about 3,500 kPa, and in the range of from about 1,350 kPa to about 3,000 kPa in another example, and in the range of from about 1,600 kPa to about 2,200 kPa in yet another example.

The gas phase reactor can be capable of producing from about 10 kg of polymer per hour to about 90,000 kg/hr, and greater than about 450 kg/hr in another example, and greater than about 4,500 kg/hr in yet another example, and greater than about 10,000 kg/hr in yet another example, and greater than about 15,000 kg/hr in yet another example, and greater than about 30,000 kg/hr in yet another example, and from about 30,000 kg/hr to about 75,000 kg/hr in yet another example. Additional reactor details and techniques for operating the reactor are discussed and described in, for example, U.S. Pat. Nos. 3,709,853; 4,003,712; 4,011,382; 4,302,566; 4,543,399; 4,882,400; 5,352,749; and 5,541,270; and EP 0 802 202 A.

The catalyst can polymerize one or more olefins at a catalyst productivity of at least 12,000, at least 13,000, at least 14,000, at least 15,000, at least 16,000, at least 17,000, at least 18,000, at least 19,000, at least 20,000, or at least 21,000 grams polymer per gram catalyst (gPE/g Cat). The catalyst also can polymerize one or more olefins at a catalyst productivity ranging from a low of about 12,500, about 13,500, or about 14,500 to a high of about 15,500, about 16,500, about 17,500, about 18,500, about 19,500, about 20,500, or about 21,500 gPE/g Cat.

The catalyst can polymerize one or more olefins at a catalyst productivity of at least 2,000, at least 3,000, at least 4,000, at least 5,000, at least 6,000, at least 7,000, at least 8,000, at least 9,000, at least 10,000, or at least 11,000 grams polymer per gram catalyst (gPE/g Cat). The catalyst also can polymerize one or more olefins at a catalyst productivity ranging from a low of about 2,500, about 3,500, or about 4,500 to a high of about 5,500, about 6,500, about 7,500, about 8,500, about 9,500, about 10,500, or about 11,500 gPE/g Cat.

Polymers produced in accordance with invention are "polyolefin polymers" or "polyolefins". As used herein, "polyolefin polymers" or "polyolefins" refer to at least 75 mole % of the polymer is derived from hydrocarbon monomers, preferably at least 80 mole %, preferably at least 85 mole %, preferably at least 90 mole %, preferably at least 95 mole %, and preferably at least 99 mole %. Hydrocarbon monomers are monomers made up of only carbon and hydrogen. For example, the monomers to be polymerized are aliphatic or alicyclic hydrocarbons (as defined under "Hydrocarbon" in Hawley's Condensed Chemical Dictionary, 13th edition, R. J. Lewis ed., John Wiley and Sons, New York, 1997). In another embodiment, the monomers to be polymerized are linear, branched alpha-olefins, and/or cyclic, preferably $C_2$ to $C_{40}$ linear or branched alpha-olefins, preferably $C_2$ to $C_{20}$ linear or branched alpha-olefins, e.g., ethylene, propylene, butene, pentene, hexene, heptene, octene, nonene, decene, undecene, dodecene, or mixtures thereof. Well-suited monomers include two or more olefin monomers of ethylene, propylene, butene-1, pentene-1, 4-methyl-pentene-1, hexene-1, heptene-1, octene-1, decene-1, and mixtures thereof.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In another embodiment of the invention, ethylene or propylene is polymerized with at least two different comonomers, optionally, one of which may be a diene, to form a terpolymer.

The monomer flow rate to the reactor can vary. For example, the monomer flow rate can range from about 1,000 lb/hr to about 200,000 lb/hr (455 kg/hr to 90,718 kg/hr). In one or more embodiments, the monomer flow can be 25,000 to 150,000 lb/hr (11,340 kg/hr to 68,039 kg/hr). The monomer flow rate can also range from a low of about 25,000 lb/hr (11,340 kg/hr), 50,000 lb/hr (22,680 kg/hr), 75,000 lb/hr (34,019 kg/hr), 100,000 lb/hr (45,359 kg/hr), or 125,000 lb/hr (56,699 kg/hr) to a high of about 150,000 lb/hr (68,039 kg/hr), 175,000 lb/hr (79,379 kg/hr), or 200,000 lb/hr (90,718 kg/hr).

Figure 2:
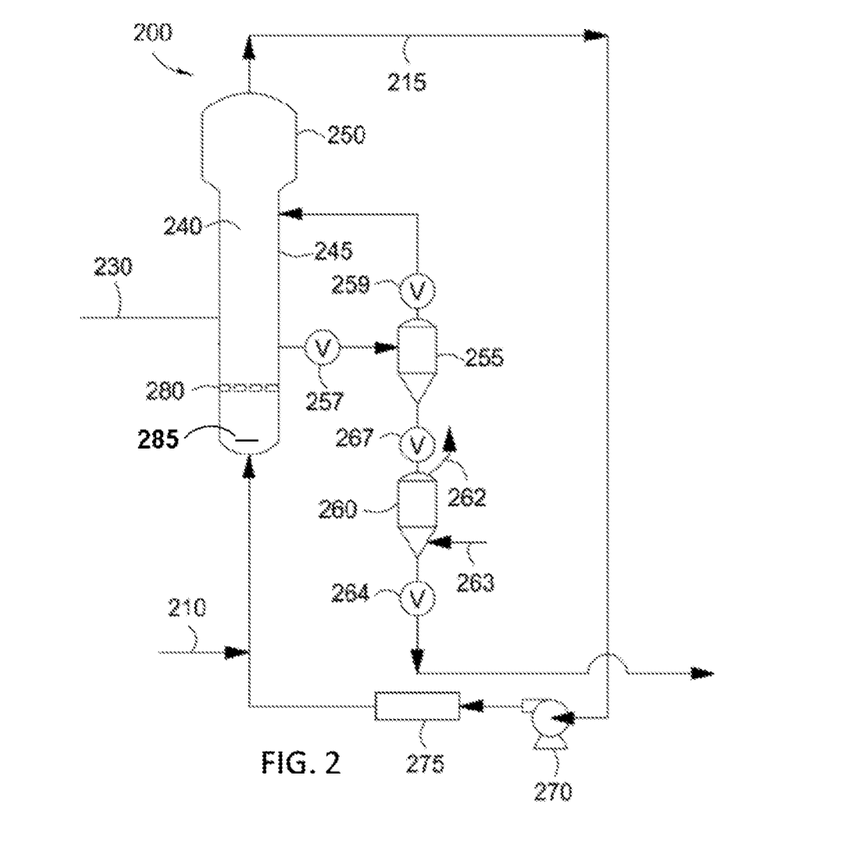
FIG. 2 depicts a flow diagram of an illustrative gas phase system that can be used in accordance with one or more embodiments described herein.

FIG. 2 depicts a flow diagram of an illustrative gas phase system that can be used in accordance with one or more embodiments described. The system 200 includes a reactor 240 in fluid communication with one or more discharge tanks 255 (only one shown), surge tanks 260 (only one shown), recycle compressors 270 (only one shown), and heat exchanger 275 (only one shown). The polymerization system 200 can also include more than one reactor 240 arranged in series, parallel, or configured independent from the other reactors, each reactor having its own associated tanks 255, 260, compressors 270 and heat exchangers 275 or alternatively, sharing any one or more of the associated tanks 255, 260, compressors 270 and heat exchangers 275. For simplicity and ease of description, embodiments of the invention will be further described in the context of a single reactor train.

In one or more embodiments, the reactor 240 can include a reaction zone 245 in fluid communication with a velocity reduction zone 250. The reaction zone 245 can include a bed of growing polymer particles, formed polymer particles and catalyst particles fluidized by the continuous flow of polymerizable and modifying gaseous components in the form of make-up feed and recycle fluid through the reaction zone 245.

A feed stream or make-up stream 210 can be introduced into the polymerization system at any point. For example, the feed stream or make-up stream 210 can be introduced to the reactor fluid bed in the reaction zone 245 or to the expanded section 250 or to any point within the recycle stream 215. Preferably, the feed stream or make-up stream 210 is introduced to the recycle stream 215 before or after the heat exchanger 275. In FIG. 2, the feed stream or make-up stream 210 is depicted entering the recycle stream 215 after the heat exchanger ("cooler") 275.

The term "feed stream" as used herein refers to a raw material, either gas phase or liquid phase, used in a polymerization process to produce a polymer product. For example, a feed stream may be any olefin monomer including substituted and unsubstituted alkenes having two to 12 carbon atoms, such as ethylene, propylene, 1-butene, 1-pentene, 4-methyl-1-pentene, 1-hexene, 1-octene, 1-decene, 1-dodecene, styrene, and derivatives thereof. The feed stream also includes non-olefinic gas such as nitrogen and hydrogen. The feeds may enter the reactor at multiple and different locations. For example, monomers can be introduced into the polymerization zone in various ways including direct injection through a nozzle (not shown in the drawing) into the bed. The feed stream can further include one or more non-reactive alkanes that may be condensable in the polymerization process for removing the heat of reaction. Illustrative non-reactive alkanes include, but are not limited to, propane, butane, isobutane, pentane, isopentane, hexane, isomers thereof and derivatives thereof.

The fluidized bed has the general appearance of a dense mass of moving particles as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone 245, the superficial gas velocity through the bed must exceed the minimum flow required for fluidization. Preferably, the superficial gas velocity is at least two times the minimum flow velocity. Ordinarily, the superficial gas velocity does not exceed 1.52 msec and usually no more than 0.762 msec is sufficient.

In general, the height to diameter ratio of the reaction zone 245 can vary in the range of from about 2:1 to about 5:1. The range, of course, can vary to larger or smaller ratios and depends upon the desired production capacity. The cross-sectional area of the velocity reduction zone 250 is typically within the range of about 2 to about 3 multiplied by the cross-sectional area of the reaction zone 245.

The velocity reduction zone 250 has a larger inner diameter than the reaction zone 245. As the name suggests, the velocity reduction zone 250 slows the velocity of the gas due to the increased cross sectional area. This reduction in gas velocity allows particles entrained in the upward moving gas to fall back into the bed, allowing primarily only gas to exit overhead of the reactor 240 through recycle gas stream 215.

The recycle stream 215 can be compressed in the compressor 270 and then passed through the heat exchanger 275 where heat is removed before it is returned to the bed. The heat exchanger 275 can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream 215 is returned to the reactor 240. The cooled recycle stream absorbs the heat of reaction generated by the polymerization reaction. In one or more embodiments above or elsewhere herein, condensing mode operation such as described in U.S. Pat. Nos. 4,543,399; 4,588,790; 5,352,749; and 5,462,999 can be used to assist in heat removal from the reactor 240.

In one or more embodiments, the recycle stream 215 is returned to the reactor 240 and to the fluidized bed through a gas distributor plate 280. A gas deflector 285 is preferably installed at the inlet to the reactor to prevent contained polymer particles from settling out and agglomerating into a solid mass and to prevent liquid accumulation at the bottom of the reactor as well to facilitate easy transitions between processes which contain liquid in the cycle gas stream and those which do not and vice versa. An illustrative deflector suitable for this purpose is described in U.S. Pat. Nos. 4,933,149 and 6,627,713.

The catalyst or catalyst system is preferably introduced to the fluidized bed within the reactor 240 through the one or more injection nozzles 230. The catalyst or catalyst system is preferably introduced as pre-formed particles in one or more liquid carriers (i.e., a catalyst slurry). Suitable liquid carriers include mineral oil and liquid hydrocarbons including but not limited to propane, butane, isopentane, hexane, heptane and octane, or mixtures thereof. A gas that is inert to the catalyst slurry such as, for example, nitrogen or argon, can also be used to carry the catalyst slurry into the reactor 240. In one or more embodiments, the catalyst or catalyst system can be a dry powder. In one or more embodiments, the catalyst or catalyst system can be dissolved in the liquid carrier and introduced to the reactor 240 as a solution.

On discharge of particulate polymer product from reactor 240, it is desirable and preferable to separate fluid from the product and to return the fluid to the recycle line 215. In one or more embodiments, this separation is accomplished when fluid and product leave the reactor 240 and enter the product discharge tanks 255 (one is shown) through valve 257, which may be a ball valve designed to have minimum restriction to flow when opened. Positioned above and below the product discharge tank 255 are conventional valves 259, 267. The valve 267 allows passage of product into the product surge tanks 260 (only one is shown).

In at least one embodiment, to discharge particulate polymer from reactor 240, valve 257 is opened while valves 259, 267 are in a closed position. Product and fluid enter the product discharge tank 255. Valve 259 is opened to allow the fluid to return to the reactor 240. Valve 257 is closed and the product is allowed to settle in the product discharge tank 255. Valve 259 is then closed. Valve 267 is opened and any product in the product discharge tank 255 flows into the product surge tank 260. Valve 267 is then closed. Product is then discharged from the product surge tank 260 through valve 264. Non-product materials may then exit 262. The product can be further purged via purge stream 263 to remove residual hydrocarbons and conveyed to a pelletizing system or to storage (not shown). The particular timing sequence of the valves 257, 259, 267, 264 is accomplished by the use of conventional programmable controllers.

Another preferred product discharge system which can be alternatively employed is that disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor is equipped with an adequate venting system (not shown) to allow venting of the bed during start up and shut down. The reactor does not require the use of stirring and/or wall scraping. The recycle line 215 and the elements therein (compressor 270, heat exchanger 275) should be smooth surfaced and devoid of unnecessary obstructions so as not to impede the flow of recycle fluid or entrained particles.

Start Ups

Start ups in a pilot scale reactor and commercial size reactors have resulted in reactor shut downs due to sheeting, "cat-ball" formation for polymer, cycle line plugging, or cooler or upper/lower bed segregation. Polymer fines generated at start up can cause cycle line and/or cooler plugging, if the fines can be easily entrained from the reactor. There also can be times when high fines appear to be responsible for reactor sheeting and bed segregation (i.e., high fines moving to the top of the bed) and poor fluidization or spouting and poor heat and mass transfer inside the fluid bed. Normally, the reactor bed level can be monitored to adjust the bed weight during start ups when bed-expansion of the polymer granules occurs. Maintaining the bed level at the neck of the reactor can be a normal guideline to prevent high entrainment rates into the cycle line as well as provide polymer at the neck to provide scrubbing along the walls to prevent the growth of a dome sheet.

In other aspects, the amount of nitrogen gas that is used to spray the slurry catalyst into the reactor can be reduced to reduce and control the amount of fines produced at start up in a pilot scale reactor. The amount of nitrogen usually depends on the amount of catalyst that can be fed to the reactor. In a pilot plant, higher nitrogen provides extra atomization power and produces fines as high as 60% or more, and can either cause a reactor shutdown due to cycle line/cooler plugging, reactor sheeting, or reactor discharge difficulties due to poor flowing powder.

The bed weight of a pilot plant reactor also can be reduced quickly after catalyst feed begins to prevent entrainment of fines into the cycle line and cooler. Normally, the upper bed level can be used as a guide to determine when and how much bed to remove from the reactor. Relying on the bed weight, however, does not always provide a rapid enough indication to prevent cycle line plugging. After the plate static increases, the bed weight reduction begins aggressively even though the upper bed level has not been increasing. The bed weight can be reduced to as low as 500 lbs which is believed to be well below the neck but still avoid dome sheeting. The entrainment static and reactor static can also increase during start up and can be monitored while continuing to decrease the bed weight.

In another embodiment, the production rate increase during start up can be held back by manually controlling the feed rate of ethylene to the reactor even though the ethylene reactor partial pressure can drop below target and call for more ethylene. Normally, automatic control can be used to adjust the fresh ethylene feed to the reactor to keep the ethylene concentration at target. It seems that reducing the amount of fresh ethylene feed to the reactor at start up controls the increase in the reaction production rate during start up. Alternatively, the ethylene partial pressure target can be reduced at start up to moderate the initial activity and then increased after the reactor static returns to normal.

Catalysts and Catalyst Systems

The terms "catalyst" and "catalyst systems" may be used interchangeably to mean those activated compounds or compositions that are capable of polymerizing one or more olefins that are described above. In an embodiment, the catalyst system includes at least one "catalyst component" and at least one "activator" or at least one "cocatalyst." The catalyst system can also include other components, such as supports, and is not limited to the catalyst component and/or activator alone or in combination. The catalyst system can include any number of catalyst components in any combination as described herein.

The term "catalyst component" includes any compound that, once appropriately activated, is capable of catalyzing the polymerization or oligomerization of olefins. In several embodiments, the catalyst component includes at least one Group 3 to Group 12 atom and optionally at least one leaving group bound thereto. As used herein, all reference to the Periodic Table of the Elements and groups thereof is to the NEW NOTATION published in Hawley's Condensed Chemical Dictionary, Thirteenth Edition, John Wiley & Sons, Inc., (1997) (reproduced there with permission from IUPAC), unless reference is made to the previous IUPAC form denoted with Roman numerals (also appearing in the same), or unless otherwise noted. The term "leaving group" refers to one or more chemical moieties bound to the metal center of the catalyst component that can be abstracted from the catalyst component by an activator, thereby producing the species active towards olefin polymerization or oligomerization.

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Chromium Catalysts

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethylhexanoate, chromium acetylacetonate (Cr(AcAc)3), and the like.

Metallocene Catalysts

Metallocene catalysts or simple metallocenes are generally described throughout in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and in particular, for use in the synthesis of polyethylene in 1 Metallocene-Based Polyolefins 261-377 (2000). The metallocene catalysts as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. The metallocene catalyst may be supported on a support material in an embodiment, and may be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Or the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further, non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

Group 15-Containing Catalysts

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. Nos. 5,318,935; 5,889,128; 6,333,389; and 6,271,325 B1. In one embodiment, the Group 15-containing catalyst includes a Group 4 iminophenol complexes, Group 4 bis(amide) complexes, and Group 4 pyridyl-amide complexes that are active towards olefin polymerization to any extent.

Activators

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

Lewis acids may be used to activate the metallocenes or other catalysts. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis(pentafluorophenyl)boron may be also be used. Further, a trisperfluorophenyl boron metalloid precursor may be used. Any of those activators/precursors can be used alone or in combination with the others.

Ziegler-Natta Catalysts

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 103 120 A; EP 102 503 A; EP 0 231 102 A; EP 0 703 246 A; RE 33,683; U.S. Pat. Nos. 4,302,565; 5,518,973; 5,525, 678; 5,288,933; 5,290,745; 5,093,415 and 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639; 4,077,904; 4,482,687; 4,564,605; 4,721,763; 4,879,359; and 4,960,741. The conventional-type transition metal catalyst compounds that may be used include transition metal compounds from Groups 3 to 17, or Groups 4 to 12, or Groups 4 to 6 of the Periodic Table of Elements.

These conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3C_1$, $Ti(OC_2H_5)C_{13}$, $Ti(OC_4H_9)_3Cl$, $Ti(OC_3H_7)_2Cl_2$, $Ti(OC_2H_5)_2Br_2$, and $TiCl_3 \cdot \frac{1}{3}AlCl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art.

Conventional cocatalysts for the above conventional-type transition metal catalysts may be represented by the formula $M_3M_{4v}X_{2c}R_{3b-c}$, wherein $M_3$ is a metal from Group 1 to 3 and 12 to 13 of the Periodic Table of Elements; $M_4$ is a metal of Group 1 of the Periodic Table of Elements; v is a number from 0 to 1; each $X_2$ is any halogen; c is a number from 0 to 3; each $R_3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M_3R_{3k}$, where $M_3$ is a Group IA, IIA, IIB or IIIA metal, such as lithium, sodium, beryllium, barium, boron, aluminum, zinc, cadmium, and gallium; k equals 1, 2 or 3 depending upon the valency of $M_3$ which valency in turn normally depends upon the particular Group to which $M_3$ belongs; and each $R_3$ may be any monovalent radical that include hydrocarbon radicals and hydrocarbon radicals containing a Group 13 to 16 element like fluoride, aluminum or oxygen or a combination thereof Mixed Catalysts The mixed catalyst system can be a bimetallic catalyst composition or a multi-catalyst composition, for example, containing two or more catalysts of the same or different transition metal and having at least two active sites for polymerization. As used herein, the terms "bimetallic catalyst composition" and "bimetallic catalyst" include any composition, mixture, or system that includes two or more different catalysts, each having the same or different metal group. The terms "multi-catalyst composition" and "multi-catalyst" include any composition, mixture, or system that includes two or more different catalysts regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst component and at least one non-metallocene component, for example, a Group-15 containing catalyst or a Ziegler-Natta catalyst. In another embodiment, the mixed catalyst system is a mixed metallocene catalyst system comprising two more different metallocene catalysts.

Control System

The flow rate adjustment of the one or more monomers can be made manually or automatically using a feedback control loop that is operated by a control unit. For example, a conventional data processor, including a CPU, memory, I/O, program storage, a connecting bus, and other appropriate components, could be programmed or otherwise designed to facilitate the practice of the methods of the invention.

Referring again to FIG. 1, some comonomer can be consumed by low-grade reaction during the lightoff phase. It can be specifically recommended that comonomer not be added at this point in order to maintain the calculated inventory of the comonomer. Instead, the amount of comonomer consumed by low-grade reaction during lightoff can be estimated by a monomer balance, assuming an instantaneous density of polymer produced or using actual measured gas concentrations to calculate the instantaneous polymer density of polymer produced from analyzer data. This estimated amount would then be made up by feeding comonomer to the reactor to maintain estimated inventories in the reactor, not concentrations. The amount of comonomer consumed before robust reaction occurs can be small and can be neglected, depending on the desired control strategy for the process.

Figure 3:
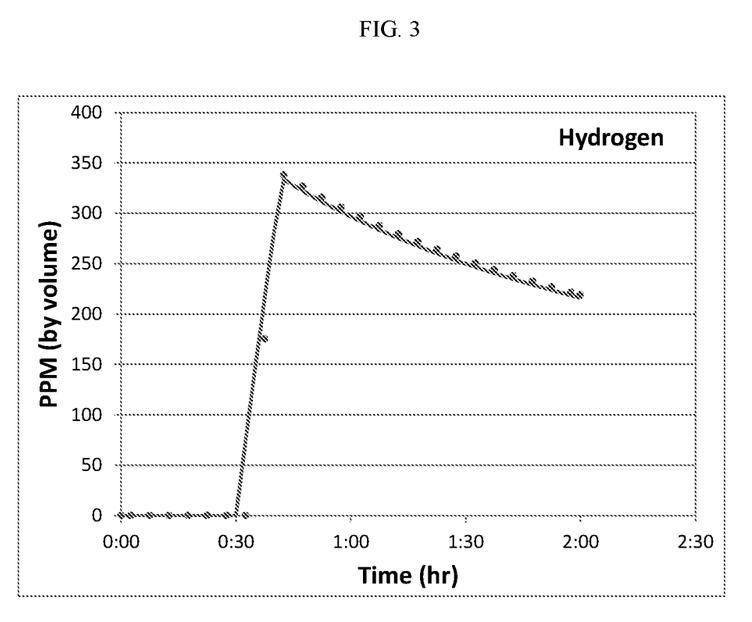
FIG. 3 graphically represents hydrogen concentration (ppmv) versus time (hours).
Figure 4:
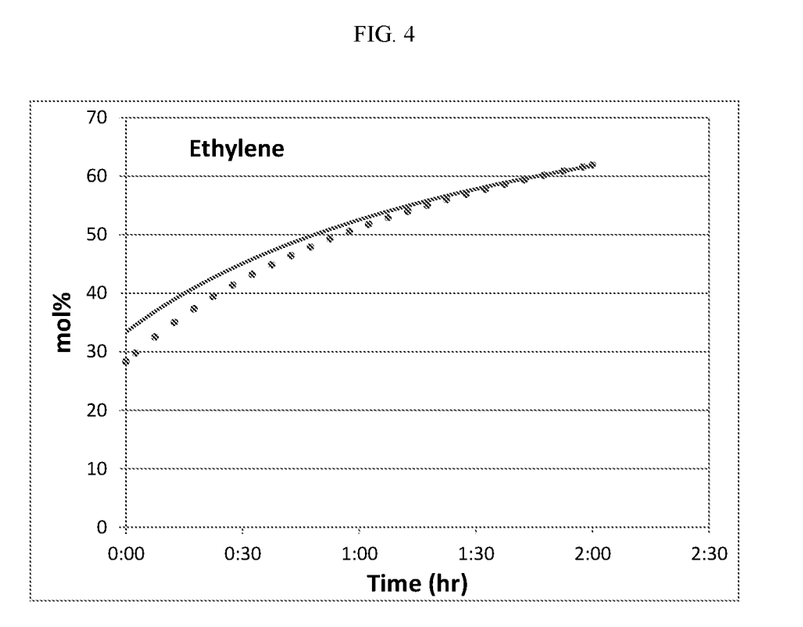
FIG. 4 graphically represents ethylene concentration (mol %) versus time (hours).
Figure 5:
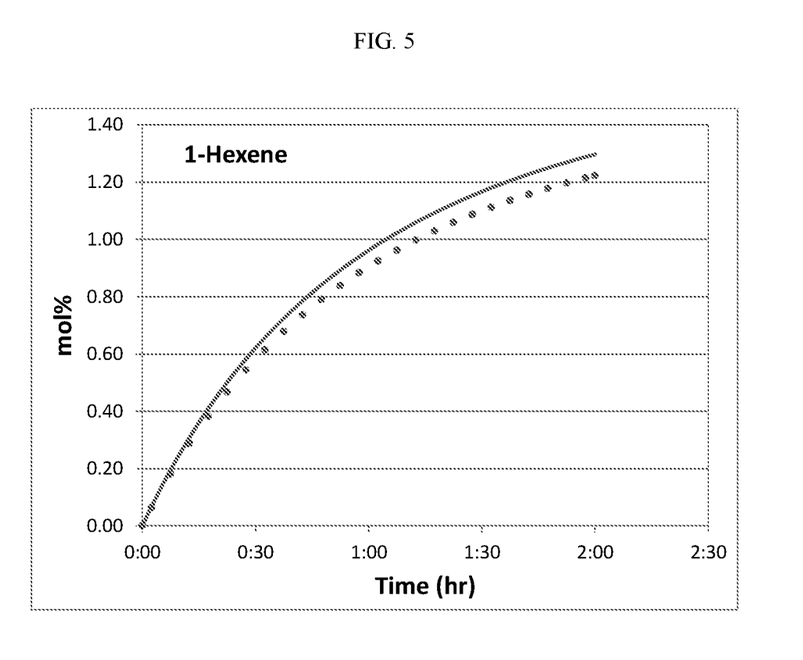
FIG. 5 graphically represents 1-hexene concentration (mol %) versus time (hours).
Figure 6:
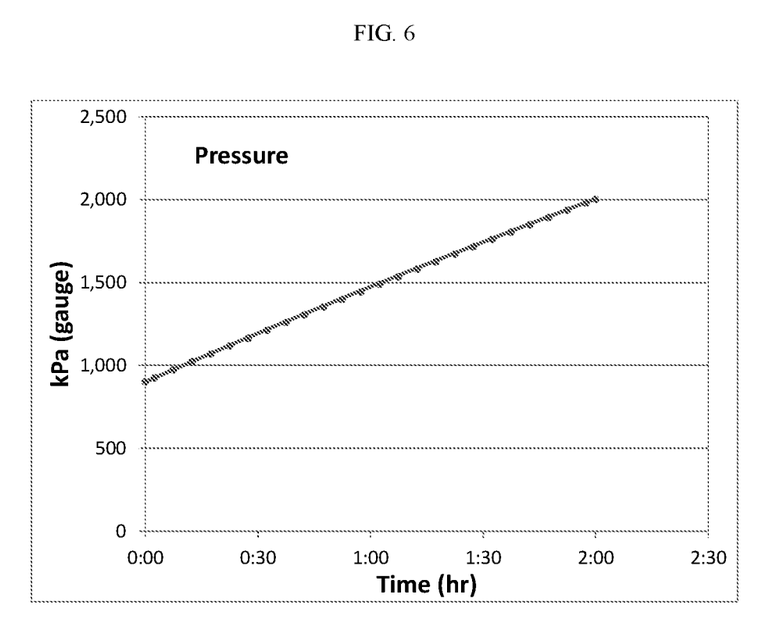
FIG. 6 graphically represents the reactor pressure (kPag) versus time (hours).

Still referring to FIG. 1, step 130 is optional. In step 130, the composition of the monomer, comonomer and hydrogen can be monitored as a function of time, such as every second, minute, 5 minutes, 30 minutes, or hourly, for example, to predict a concentration for each monomer, commoner and hydrogen. FIG. 3 graphically represents hydrogen concentration (ppmv) versus time (hours). FIG. 4 graphically represents ethylene concentration (mol %) versus time (hours). FIG. 5 graphically represents 1-hexene concentration (mol %) versus time (hours). FIG. 6 graphically represents the reactor pressure (kPag) versus time (hours). In FIGS. 3-7, the dots represent the measured concentration using a gas analyzer and the line represents the predicted concentration. Step 130 can be useful in generating the dots for these reactor feeds.

The concentration of comonomer primarily affects the density of the polymer produced. As such, the concentration of comonomer also directly affects fouling in the reactor by lowering the melting temperature of the polymer in the reactor. Controlling the concentration of comonomer to avoid the production of lower density polymer than the target density reduces the possibility of fouling of the reactor plate or the formation of agglomerates, sheets, and/or chunks in the reactor.

Errors arise from monomer and comonomer consumption calculations and analyzer malfunctions. Having a definitive start up inventory in the reactor significantly helps start ups to be reproduced consistently from one to another. Analysis of historical data has shown that start ups can be especially more reliable when the inventory of comonomer in the reactor is more consistent because inconsistent comonomer addition during start ups has been more prone to plate fouling and dome sheeting.

Polymer Properties

In one embodiment, the polymers produced by the process of the invention typically have a molecular weight distribution (Mw/Mn) of about 1.5 to about 30, particularly about 2 to about 15, more preferably about 2 to about 10, even more preferably about 2.2 to less than about 8, and most preferably from about 2.5 to about 8. The ratio of Mw/Mn is measured by gel permeation chromatography techniques well known in the art.

Polyethylene polymers may have a melt index (MI) or (12.16) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. The polyethylene polymers may have a melt index ratio (121.6/12.16 or for a shorthand "121/12") (measured by ASTM-D-1238-F) of from 10 to less than 25, more preferably from about 15 to less than 25. Further, in another embodiment, the polymers have a melt index ratio ($I_{21}/I_2$) of from preferably greater than 25, more preferably greater than 30, even more preferably greater than 40, still even more preferably greater than 50 and most preferably greater than 65. Alternatively, the polyethylene polymers may have a melt index ratio ($I_{21}/I_2$) in the range of from 15 to 65, preferably in the range of from about 20 to about 35, more preferably in the range of from about 22 to about 30, and most preferably in the range of from 24 to 29.

The polyethylene can have a density ranging from a low of about 0.89 g/cm$^3$, about 0.90 g/cm$^3$, or about 0.91 g/cm$^3$ to a high of about 0.95 g/cm$^3$, about 0.96 g/cm$^3$, or about 0.97 g/cm$^3$. Density can be determined in accordance with ASTM D-792.

End Use Applications

The polyethylene polymers can be suitable for articles such as films, fibers, and nonwoven fabrics, extruded articles, and molded articles. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, pond liners etc. Examples of molded articles include single and multi-layered constructions in the form of bottles, tanks, large hollow articles, rigid food containers, toys, etc.

Example

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following example is put forth so as to provide those skilled in the art with a complete disclosure and description and is not intended to limit the scope of that which the inventors regard as their invention.

Figure 7:
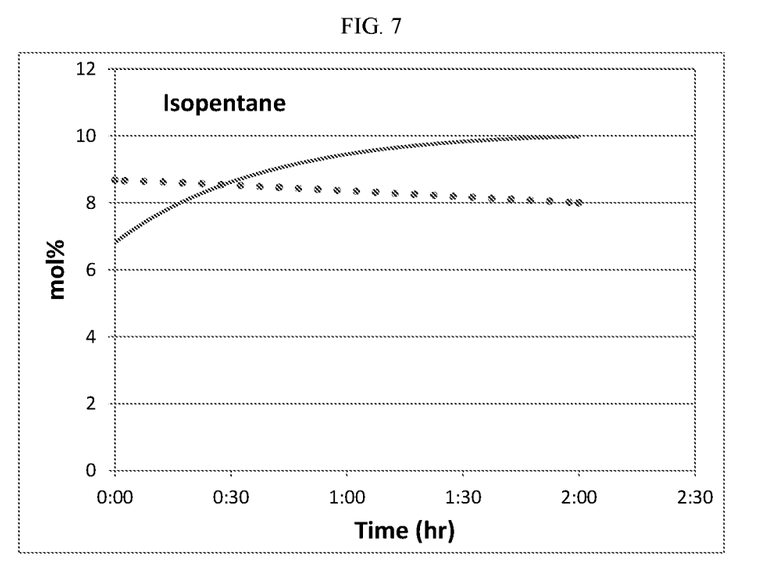
FIG. 7 graphically represents isopentane concentration (mol %) versus time (hours).
Figure 8:
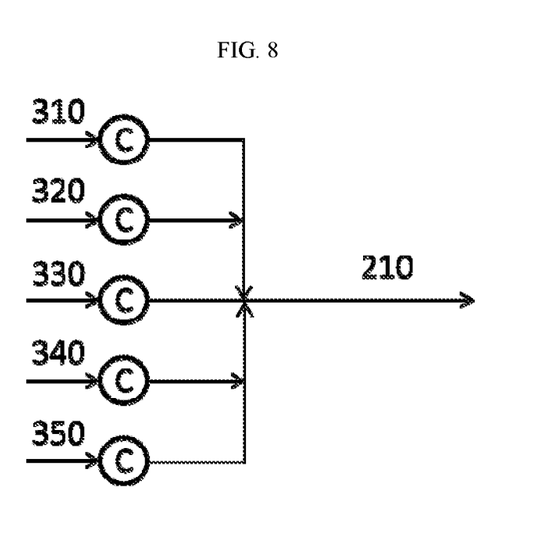
FIG. 8 depicts a flow diagram of an illustrative flow meter system to feed reactants and inert materials to the process shown in FIG. 2 and can be used in accordance with one or more embodiments described herein.

A reactor at an initial pressure of 900 kPag and temperature of 82° C. with an initial molar composition of 63.1% nitrogen, 26.3% ethylene, and 8.7% isopentane was used. Referring to FIG. 8, at time zero ethylene flow was started using flow meter 310 at 1,571 kg/hr, 1-hexene flow was started using flow meter 320 at 348 kg/hr, and isopentane flow was started using flow meter 330 at 1,376 kg/hr to feed stream or make-up stream 210 (see FIG. 2 for feed stream or make-up stream 210). After 30 minutes, hydrogen flow was started using flow meter 340 at 0.5 kg/hr to feed stream or make-up stream 210. After 12 minutes, the hydrogen flow was stopped. The reactor compositions for nitrogen, hydrogen, ethylene, isopentane, 1-hexene, and pressure are shown in FIGS. 1 to 7. As can be seen in FIG. 7, the mole percentage of isopentane was not consistent with the predicted mole percentage. The analyzer was found to have a calibration error for isopentane and was subsequently repaired. After 2:00 hr, catalyst flow was started and reaction initiated resulting in steady state operation.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for controlling start up conditions in a gas phase polymerization process, the method comprising:
    calculating an inventory for each monomer, comonomer, and hydrogen sufficient to produce a polyethylene polymer having a desired melt index and/or density;
    introducing a flow of the monomer, comonomer, and hydrogen to a reactor that is pre-loaded with polymer granules;
    stopping the flow of the comonomer to the reactor once the pre-determined comonomer inventory has been added to the reactor;
    introducing a catalyst system to the reactor at a pre-determined catalyst feed rate;
    polymerizing the monomer and comonomer in the presence of the catalyst system at polymerization conditions sufficient to produce the polyethylene polymer; and then
    adding additional monomer, comonomer, and hydrogen to the reactor at a predetermined rate based on the polymer production rate and polymer melt index and/or density.

2. The method of claim 1, further comprising introducing additional comonomer to the reactor while the catalyst system is being introduced to make up for any comonomer loss due to venting.

3. The method of claim 1, wherein the monomer is ethylene.

4. The method of claim 1, wherein the comonomer is 1-hexene.

5. The method of claim 1, wherein the comonomer is 1-butene.

6. The method of claim 1, wherein the pre-determined comonomer inventory is a function of the reactor pressure.

7. The method of claim 1, wherein the pre-determined comonomer inventory is met when the reactor pressure is about 15 Bar(g) to about 20 Bar(g).

8. The method of claim 1, wherein the additional monomer, comonomer, and hydrogen is added to the reactor after the reactor pressure is about 20 Bar(g) or more.

9. A method for controlling start up conditions in a gas phase polymerization process, the method comprising:
   calculating an inventory for each monomer, comonomer, and hydrogen sufficient to produce a polyethylene polymer having a desired melt index and density;
   introducing a flow of the monomer, comonomer, and hydrogen to a reactor pre-loaded with polymer granules, the polymer granules having a melt index and density that are each the same or substantially the same as the respective desired melt index and desired density of the polyethylene polymer;
   monitoring the concentration of the monomer, comonomer, and hydrogen as a function of time to compare to the calculated inventory for each monomer, comonomer, and hydrogen;
   stopping the flow of the comonomer to the reactor once the calculated comonomer inventory has been added to the reactor;
   introducing a catalyst system to the reactor at a pre-determined catalyst feed rate into the reactor;
   polymerizing the monomer and comonomer in the presence of the catalyst system at polymerization conditions sufficient to produce the polyethylene polymer at a production rate of about 10% to 15% of a steady-state production rate; and then adding additional monomer, comonomer, and hydrogen to the reactor at a predetermined rate based on the polymer production rate and polymer melt index and density.

10. The method of claim 9, further comprising introducing additional comonomer to the reactor while the catalyst system is being introduced to make up for any comonomer loss due to venting.

11. The method of claim 9, wherein the monomer is ethylene.

12. The method of claim 9, wherein the at least one comonomer is 1-hexene.

13. The method of claim 9, wherein the at least one comonomer is 1-butene.

14. The method of claim 9, wherein the pre-determined comonomer inventory is a function of the reactor pressure.

15. The method of claim 9, wherein the pre-determined comonomer inventory is met when the reactor pressure is about 15 Bar(g) to about 20 Bar(g).

16. The method of claim 9, wherein the additional monomer, comonomer and hydrogen is added to the reactor after the reactor pressure is about 20 Bar(g) or more.

17. The method of claim 9, wherein the catalyst is sprayed into the reactor using nitrogen as a carrier gas and wherein the amount of nitrogen is reduced while producing the polyethylene polymer at a production rate of about 10% to 15% of the steady-state production rate, and then increased after the steady-state production rate is reached.

* * * * *